United States Patent
Odendaal et al.

(10) Patent No.: US 10,164,887 B2
(45) Date of Patent: Dec. 25, 2018

(54) CIRCUIT AND METHOD FOR SQUELCHING AND UNSQUELCHING SERIAL PORT INGRESS TRAFFIC

(71) Applicant: ALCATEL-LUCENT CANADA INC., Ottawa (CA)

(72) Inventors: Fred Odendaal, Stittsville (CA); Jean Labonte, Gatineau (CA)

(73) Assignee: Alcatel Lucent, Paris (FR)

( * ) Notice: Subject to any disclaimer, the term of this patent is extended or adjusted under 35 U.S.C. 154(b) by 128 days.

(21) Appl. No.: 15/334,142

(22) Filed: Oct. 25, 2016

(65) Prior Publication Data

US 2018/0115489 A1    Apr. 26, 2018

(51) Int. Cl.
*H04L 29/06* (2006.01)
*H04L 12/801* (2013.01)

(52) U.S. Cl.
CPC .............. *H04L 47/15* (2013.01); *H04L 69/28* (2013.01)

(58) Field of Classification Search
CPC ..... H04L 47/15; H04L 69/28; H04B 10/1143; H04B 1/40; H04B 1/1027; H04W 52/0258; H04W 52/0238; H04W 84/18
See application file for complete search history.

(56) References Cited

U.S. PATENT DOCUMENTS

| | | | | |
|---|---|---|---|---|
| 3,380,399 A * | 4/1968 | Southard | ................. | B60L 15/32 105/61 |
| 5,734,975 A * | 3/1998 | Zele | ....................... | H04H 20/31 327/554 |
| 5,907,418 A * | 5/1999 | Walczak | ............ | H04B 10/1143 398/106 |
| 6,486,710 B1 * | 11/2002 | Simoni | .................. | H03G 3/341 327/63 |
| 6,992,978 B1 * | 1/2006 | Humblet | ................. | H04L 12/66 370/227 |
| 9,110,798 B2 | 8/2015 | Satyarthi et al. | | |
| 9,178,804 B2 | 11/2015 | Kangas et al. | | |
| 2006/0002293 A1 | 1/2006 | Huck et al. | | |
| 2006/0064479 A1 * | 3/2006 | Meged | ..................... | H04J 3/085 709/224 |
| 2008/0219152 A1 | 3/2008 | Umansky et al. | | |
| 2009/0083587 A1 * | 3/2009 | Ng | ........................ | H03G 3/342 714/47.2 |
| 2012/0280719 A1 * | 11/2012 | Ng | ........................ | H03G 3/342 327/65 |
| 2015/0215978 A1 * | 7/2015 | Casati | ................. | H04W 76/022 370/329 |
| 2017/0277249 A1 * | 9/2017 | Low | ...................... | G06F 1/3293 |

* cited by examiner

*Primary Examiner* — Afsar M Qureshi
(74) *Attorney, Agent, or Firm* — Kramer Amado, P.C.

(57) ABSTRACT

Various embodiments relate to an apparatus and method for squelching and unsquelching serial port ingress traffic, including a squelch timer, an idle timer and a state machine which is configured to enable squelch and enable a data path, load and start the squelch timer when a character is received by the serial port, load and start the idle timer, activate a squelch state when the squelch timer expires before the idle timer and disable the data path.

19 Claims, 3 Drawing Sheets

CIRCUIT AND METHOD FOR SQUELCHING AND UNSQUELCHING SERIAL PORT INGRESS TRAFFIC

TECHNICAL FIELD

The disclosure relates generally to regulating the flow of serial port ingress traffic, and more specifically, but not exclusively, determining when to squelch and unsquelch serial port ingress traffic based on the use of a plurality of timers.

BACKGROUND

Serial Raw Socket IP transportation inputs characters from the incoming serial bit stream of a serial port and packetizes them into packets to be sent over an IP network. Importantly, only character data is packetized and transferred. This has the advantage of using a minimal amount of network bandwidth when compared to the more traditional way of carrying serial data over a C-Pipe, which transfers the entire bit stream including idle data. Both Serial Raw Socket IP transportation and C-Pipes are used in Supervisory Control and Data Acquisition ("SCADA") applications.

The problem arises when the serial device connected to serial port starts "babbling," which means to send a continuous stream of bad character data. When a serial port begins to send a continuous stream of bad character data, the adverse effect of "jamming" occurs on the listening device at the other end of the network which may prevent the listening device from communicating with other devices in the network.

There is currently no known solution for suppressing the ingress traffic of a serial port, at the serial port itself. The previous solution required the serial bit stream to be framed and the squelching/unsquelching was performed on the frame, which is not useable in a raw socket implementation where TDM ("Time Division Multiplexing") frames are not used.

For example, there is an existing squelch and unsquelch solution implemented for serial data carried over a Multi-drop Data Bridge ("MDDB"). However, the squelch and unsquelch feature is at the far-end of a typical C-Pipe. At this point in the serial data flow, the serial data has already been encapsulated into a framing format (for example, to carry sub-64 kbps traffic on a 64 kbps channel). Therefore, this squelching and unsquelching function is not usable in a Serial Raw Socket IP Transportation implementation because it requires framed data.

SUMMARY OF EXEMPLARY EMBODIMENTS

A brief summary of various embodiments is presented below. Embodiments address the need to squelch and unsquelch serial port ingress traffic.

In order to overcome these and other shortcomings of the prior art and in light of the need for a method to detect and prevent silent datapath failures, a brief summary of various exemplary embodiments is presented. Some simplifications and omissions may be made in the following summary, which is intended to highlight and introduce some aspects of the various exemplary embodiments, but not to limit the scope of the invention. Detailed descriptions of a preferred exemplary embodiment adequate to allow those of ordinary skill in the art to make and use the inventive concepts will follow in later sections.

Various embodiments described herein relate to a circuit for squelching and unsquelching serial port ingress traffic, the circuit including a squelch timer, an idle timer, and a state machine configured to enable squelch and enable a data path, load and start the squelch timer when a character is received by the serial port, load and start the idle timer, activate a squelch state when the squelch timer expires before the idle timer, and disable the data path.

In an embodiment of the present disclosure, the circuit further including an auto clear timer where the state machine is configured to load and start the auto clear timer after the squelch state is activated.

In an embodiment of the present disclosure, the state machine is configured to deactivate the squelch state when the auto clear timer expires, when the squelch state is manually cleared or when the squelch is disabled.

In an embodiment of the present disclosure, the idle timer is reset when a character is received before the expiration of the idle timer.

In an embodiment of the present disclosure, the state machine returns to an idle state when the idle timer expires before the squelch timer.

In an embodiment of the present disclosure, the circuit further including a plurality of configuration registers which include parameters configured according to characteristics of the serial port, baud rate, character length, parity and number of stop bits.

In an embodiment of the present disclosure, the circuit is a field-programmable gate array integrated circuit.

In an embodiment of the present disclosure, idle timer is configured to be set for a user-configurable amount of time.

In an embodiment of the present disclosure, the auto clear timer is configured to be set for a user configurable amount of time.

In an embodiment of the present disclosure, the characters are received from an asynchronous RS232 port.

Various embodiments described herein relate to a method for squelching and unsquelching serial port ingress traffic, the method including the steps of enabling, by a state machine, squelching and a data path, loading and starting, by the state machine, a squelch timer when a character is received by the serial port, loading and starting, by the state machine, an idle timer, activating, by the state machine, a squelch state when the squelch timer expires, and terminating, by the state machine, the data path.

In an embodiment of the present disclosure, the method further including loading and starting, by the state machine, the auto clear timer after the squelch state is activated.

In an embodiment of the present disclosure, the state machine is configured to deactivate the squelch state when the auto clear timer expires, when the squelch state is manually cleared or when the squelch is disabled.

In an embodiment of the present disclosure, the idle timer is reset when a character is received before the expiration of the idle timer.

In an embodiment of the present disclosure, the state machine returns to an idle state when the idle timer expires before the squelch timer.

In an embodiment of the present disclosure, the method further including configuring, a plurality of configuration registers, according to characteristics of the serial port, baud rate, character length, parity, and number of stop bits.

In an embodiment of the present disclosure, the idle timer is configured to be set for a user-configurable amount of time.

In an embodiment of the present disclosure, the auto clear timer is configured to be set for a user configurable amount of time.

In an embodiment of the present disclosure, the characters are received from an asynchronous RS232 port.

BRIEF DESCRIPTION OF THE DRAWINGS

The accompanying figures, where like reference numerals refer to identical or functionally similar elements throughout the separate views, together with the detailed description below, are incorporated in and form part of the specification, and serve to further illustrate embodiments of concepts that include the claimed invention, and explain various principles and advantages of those embodiments.

These and other more detailed and specific features of the present invention are more fully disclosed in the following specification, reference being had to the accompanying drawings, in which.

Figure 1:
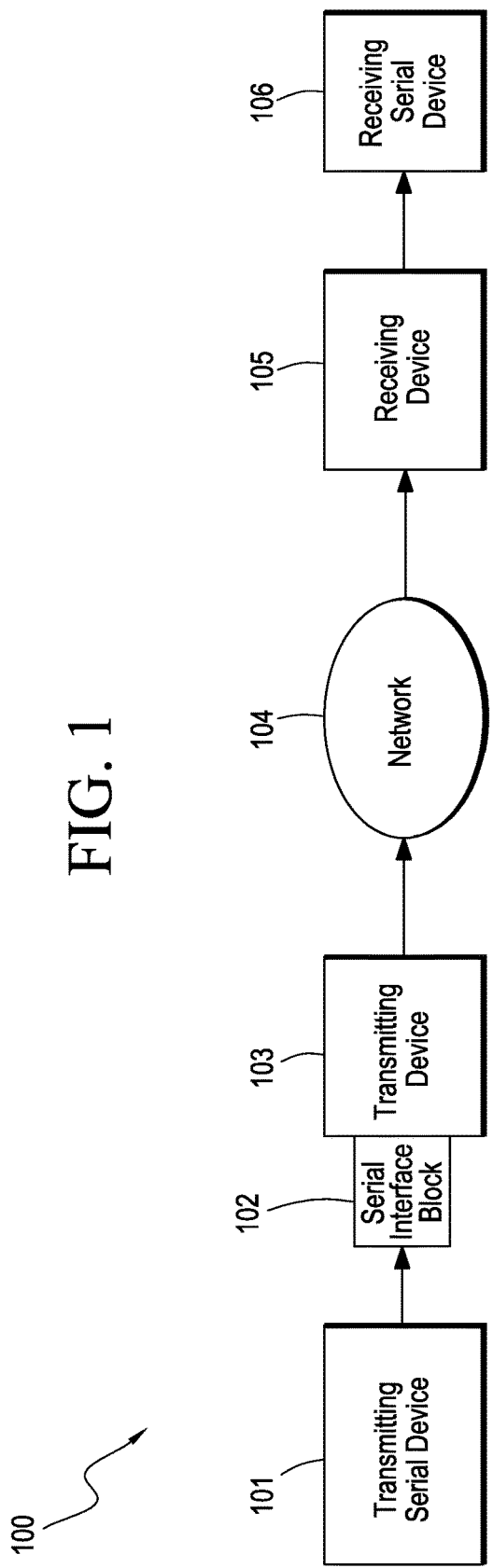
FIG. 1 is a flowchart for serial interface block ingress traffic.

Skilled artisans will appreciate that elements in the figures are illustrated for simplicity and clarity and have not necessarily been drawn to scale. For example, the dimensions of some of the elements in the figures may be exaggerated relative to other elements to help to improve understanding of embodiments of the present invention.

The apparatus and method components have been represented where appropriate by conventional symbols in the drawings, showing only those specific details that are pertinent to understanding the embodiments of the present disclosure so as not to obscure the disclosure with details that will be readily apparent to those of ordinary skill in the art having the benefit of the description herein.

DETAILED DESCRIPTION

It should be understood that the figures are merely schematic and are not drawn to scale. It should also be understood that the same reference numerals are used throughout the figures to indicate the same or similar parts.

The descriptions and drawings illustrate the principles of various example embodiments. It will thus be appreciated that those skilled in the art will be able to devise various arrangements that, although not explicitly described or shown herein, embody the principles of the invention and are included within its scope. Furthermore, all examples recited herein are principally intended expressly to be for pedagogical purposes to aid the reader in understanding the principles of the invention and the concepts contributed by the inventor(s) to furthering the art, and are to be construed as being without limitation to such specifically recited examples and conditions. Additionally, the term, "or," as used herein, refers to a non-exclusive or (i.e., and/or), unless otherwise indicated (e.g., "or else" or "or in the alternative"). Also, the various embodiments described herein are not necessarily mutually exclusive, as some embodiments can be combined with one or more other embodiments to form new embodiments. As used herein, the terms "context" and "context object" will be understood to be synonymous, unless otherwise indicated. Descriptors such as "first," "second," "third," etc., are not meant to limit the order of elements discussed, are used to distinguish one element from the next, and are generally interchangeable.

In one embodiment, incoming serial port traffic is analyzed in real time, and if it is determined that there are insufficient idle periods present in the incoming serial port traffic stream over a user-configurable amount of time, the incoming traffic from the attached serial device is stopped at the serial port. It should be noted that the squelching and unsquelching of ingress traffic can be applied to any serial interface that has an indication of when data is being transferred.

The serial port traffic will remain stopped until either manually allowed to flow again (i.e., by a user) or automatically after a user-configurable amount of idle time (i.e., no incoming traffic detected over a certain amount of time).

FIG. 1 is a block diagram for the system 100. In the illustrated example, the system 100 includes a serial interface block 102 which is configured to squelch and unsquelch the serial port ingress traffic. It should be understood that FIG. 1 displays only one exemplary embodiment of a system 100 and that other embodiments having more or less components are within the scope of this disclosure.

The system 100 includes a transmitting serial device 101, a serial interface block 102, a transmitting device 103, a network 104, a receiving device 105, and a receiving serial device 106.

In certain embodiments, the system 100 which squelches and unsquelches the ingress serial port traffic is configured on the serial interface block 102 which is positioned on the transmitting device 103.

In certain embodiments, the serial interface block 102 receives data from the serial device 101, which is positioned on the transmitting device 103. The transmitting device 103 packetizes the received data which is sent over the network 104 and then sent to a receiving device 105, which then serializes the packetized data to be sent to a receiving serial device 106.

In another embodiment, the incoming serial data stream, which is made up of character data, is received from an asynchronous RS232 port. The incoming serial data stream must have an indication of when the character data is being transferred. For example, using RS232, the serial data stream includes the start bit, which is followed by character bits, a parity bit (optional), and stop bits. A full character data is received when the character bits have been extracted, the parity bit (if present) has been checked, and the stop bits are detected.

The serial data stream is then sent to the serial interface block 102 along with a strobe signal.

Figure 2:
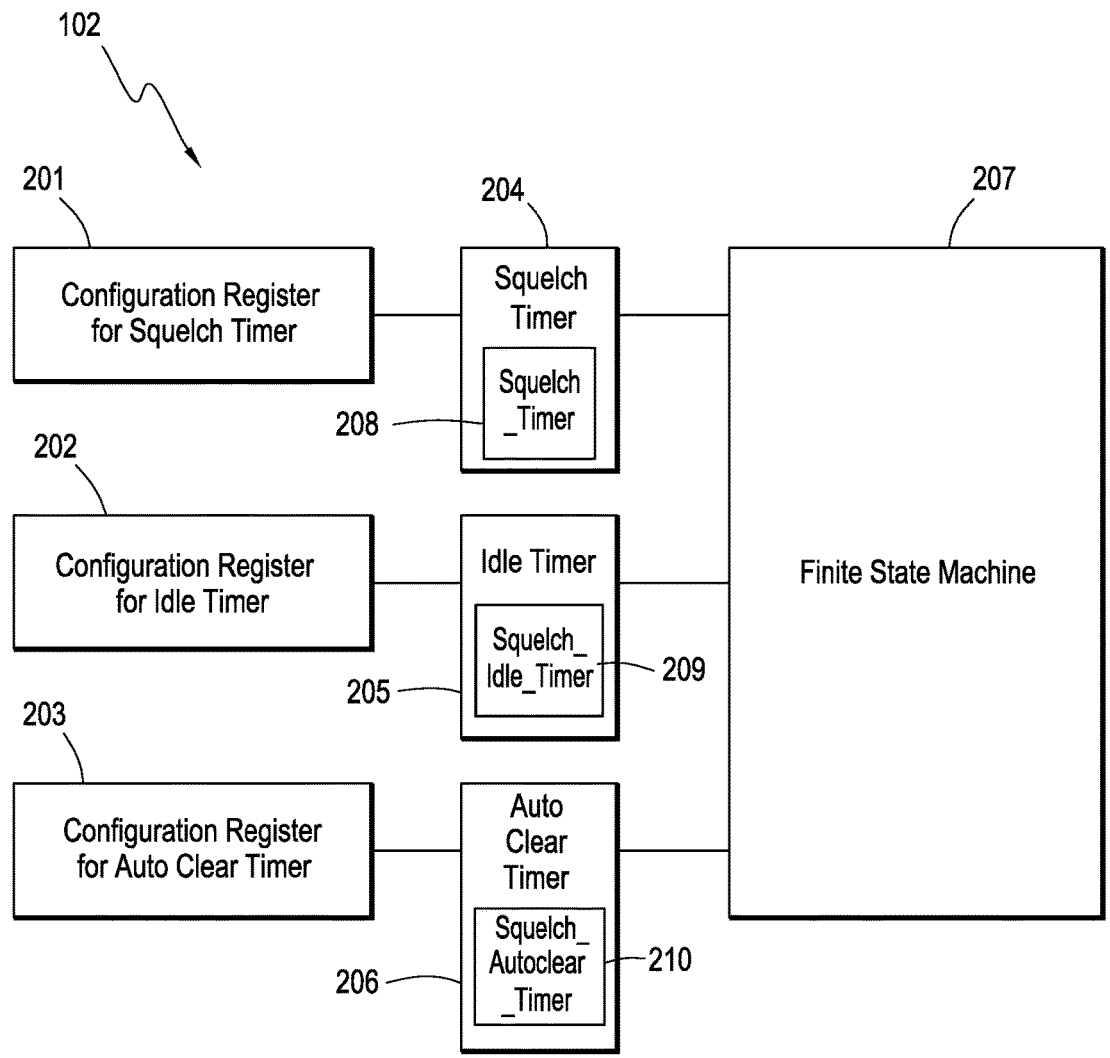
FIG. 2 is a block diagram of the circuit in the serial interface block.

FIG. 2 is a block diagram of the serial interface block 102. The serial interface block 102 includes a finite state machine 207, a squelch timer 204, an idle timer 205, an auto clear timer 206, and registers 201, 202 and 203. It should be understood that FIG. 2 displays only one exemplary embodiment of a serial interface block 102 and that other embodiments having more or less components are within the scope of this disclosure.

In certain embodiments, the configuration register for squelch timer 201 is connected to the squelch timer 204 which is connected to the finite state machine 207.

In certain embodiments, the configuration register for the idle timer 202 is connected to the idle timer 205 which connected to the finite state machine 207.

In certain embodiments, the configuration register for the auto clear timer 203 is connected to the auto clear timer 206 which is connected to the finite state machine 207.

The serial interface block 102 is configured using several parameters, including Squelch_Idle_Timer 209, Squelch_

Event, Squelch_Clear, Squelch_Autoclear_Enable, Squelch_Autoclear_Timer 210, Squelch_Enable and Squelch_Timer 208.

Squelch_Idle_Timer 209 is a parameter configured in the idle timer 205. The Squelch_Idle_Timer 209 is a timer value for contiguous idle time to be expected in the Squelch_Timer 208 period for expected behavior of the serial interface block 102. The expected range may be between 1-255 milliseconds.

Squelch_Event is a parameter, specifically, a sticky bit for indicating that a squelch has occurred.

Squelch_Clear is parameter for manually clearing a squelch condition.

Squelch_Autoclear_Enable is a parameter for auto-clearing squelch after the serial interface block 102 has been inactive for the Squelch_Autoclear_Timer 210 period.

Squelch_Autoclear_Timer 210 is a parameter configured in the auto clear timer 206. The Squelch_Autoclear_Timer 210 is a timer value for auto-clearing a squelch. The serial interface block 102 must be inactive (i.e., no non-idle characters received) for this time period to clear the squelch condition. The expected range may be between 1-120 seconds.

Squelch_Enable is a parameter which enables a squelch.

Squelch_Timer 208 is a parameter configured in the squelch timer 204. The Squelch_Timer 208 is a value for period of time to check for a squelch condition. The expected range may be between 1-120 seconds.

As discussed above, the configuration registers configure the various parameters. The values for Squelch_Timer 208, Squelch_Idle_Timer 209, and Squelch_Autoclear_Timer 210 may be based upon the characteristics of the serial interface block 102, such as baud rate, character length, parity, and number of stop bits for configuration A person skilled in the art will appreciate that a variety of different methods for squelching and unsquelching the serial port data ingress traffic may be used.

Figure 3:
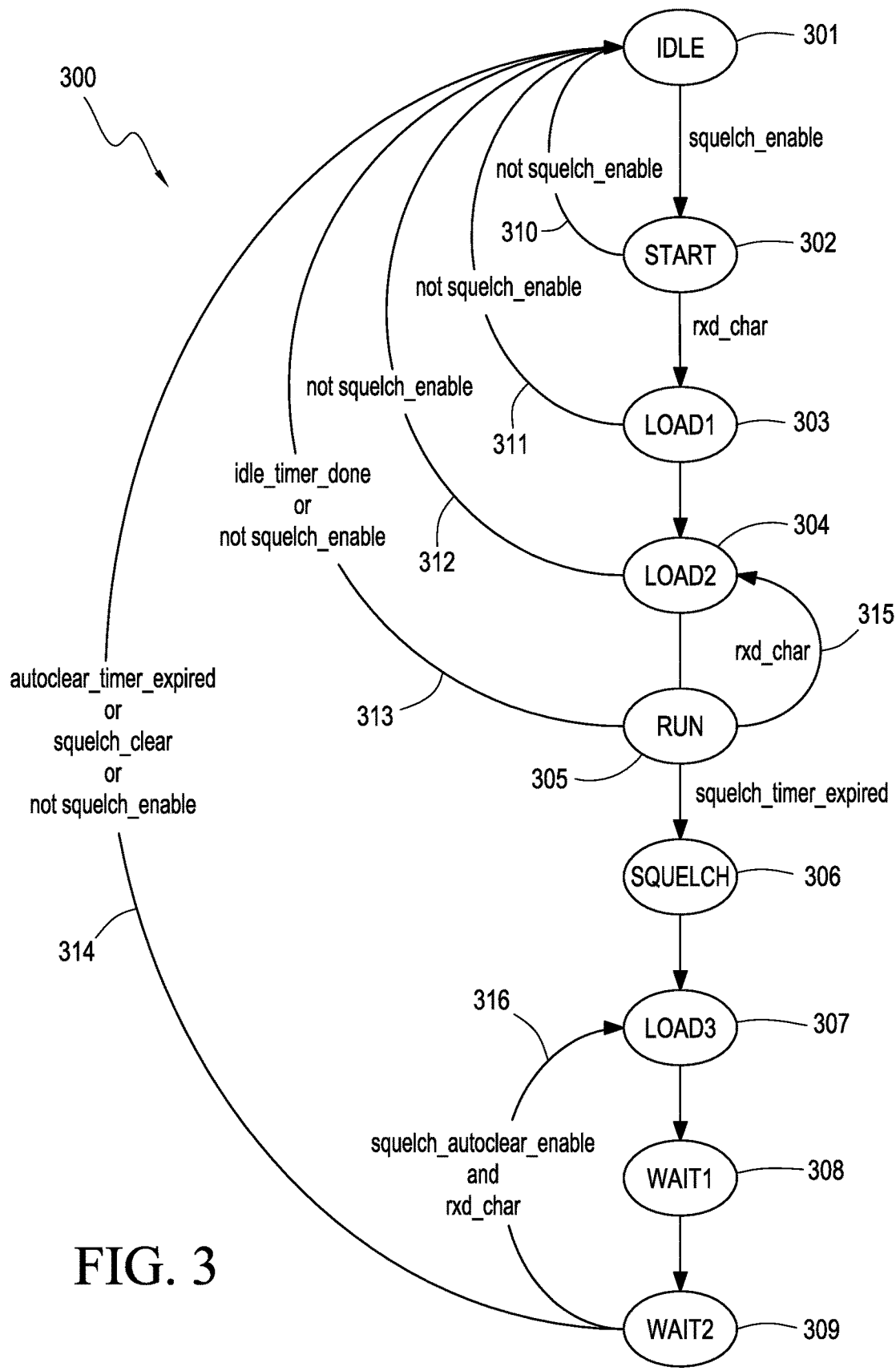
FIG. 3 is a state machine diagram of a finite state machine.

FIG. 3 illustrates a state machine diagram for the finite state machine 207. It should be understood that FIG. 3 displays one embodiment of a state machine diagram for the finite state machine 207 and that other embodiments having more or less states are within the scope of this disclosure.

The finite state machine 300 begins at the idle state 301 where the data path is activated, the Squelch_Timer 208 is stopped, and the Squelch_Autoclear_Timer 210 is stopped at the idle state 301.

The finite state machine 300 continues upon activation of the Squelch_Enable parameter (i.e., the user controlled squelch feature is enabled) and the finite state machine 300 moves to the start state 302.

If, in the finite state machine 300, at the start state 302, the Squelch_Enable parameter is not set 310, then the finite state machine 300 returns to the idle state 301. If, in the finite state machine 300, at the start state 302, a character strobe is received, the finite state machine 300 continues to the load1 state 303.

If, in the finite state machine 300, at the load1 state 303, the Squelch_Enable parameter is not set 311, then the finite state machine 300 returns to the idle state 301. At the load1 state 303, the Squelch_Timer 208 is loaded, the Squelch_Timer 208 is started, and the finite state machine 300 continues to the load2 state 304.

If, in the finite state machine 300, at the load2 state 304, the Squelch_Enable parameter is not set 312, then the finite state machine 300 returns to the idle state 301. At the load2 state 304, the Squelch_Idle_Timer 209 is loaded, the Squelch_Idle_Timer 209 is started, and the finite state machine 300 continues to the run state 305.

If, in the finite state machine 300, at the run state 305, a character strobe is received 315, then the finite state machine 300 returns to the load2 state 304. If, in the finite state machine 300, at the run state 305, the Squelch_Idle_Timer 209 expires or the Squelch_Enable parameter is not set 313, then the finite state machine 300 returns to the idle state 301. If, in the finite state machine 300, at the run state 305, the Squelch_Timer 208 expires, then the finite state machine 300 continues to the squelch state 306.

In the finite state machine 300, at the squelch state 306, the data path is deactivated, the Squelch_Event parameter is set, and the finite state machine 300 continues to the load3 state 307.

The load3 state 307 determines whether the Squelch_Autoclear_Enable parameter is set. If yes, the Squelch_Autoclear_Timer 210 is loaded and the Squelch_Autoclear_Timer 210 is started.

The finite state machine 300 continues to the wait1 state 308, where the finite state machine 300 waits for a period of time. The wait1 state 308 provides a protection against race conditions. The wait1 state is optional.

The finite state machine 300 continues to the wait2 state 309, which determines whether the Squelch_Autoclear_Enable parameter is set, and if so, whether the Squelch_Autoclear_Timer 210 has expired, and if so, the Squelch_Autoclear_Event is asserted. If, in the finite state machine 300, at the wait2 state 309, the Squelch_Autoclear_Enable parameter is set and a character strobe is received 316, then the finite state machine 300 returns to the load3 state 307. If, in the finite state machine 300, at the wait2 state 309, the Squelch_Autoclear_Timer 210 parameter has expired or Squelch_Clear parameter is set or the Squelch_Enable parameter is not set 314, then the finite state machine 300 returns to the idle state 301.

An example of the operation of the finite state machine 307 will now be provided with references to the elements of the serial port described in FIG. 2. For example, when the squelch is enabled (i.e., the Squelch_Enable parameter is set) the finite state machine 207 begins when it receives a character strobe. Then, the Squelch_Timer 208 and the Squelch_Idle_Timer 209 are started. The parameter value Squelch_Timer 208 is loaded into the Squelch Timer 204. The parameter value Squelch_Idle_Timer 209 is loaded into the Idle Timer 206. Each timer begins to count down. The Squelch_Idle_Timer 209 is restarted when a character strobe is received. If the Idle_Timer expires before the Squelch_Timer 208, the process is restarted. If the Squelch_Timer 208 expires first, the process turns squelch on (i.e. sets the Squelch status flag to on) and the data path is deactivated. If, prior to squelch being turned on, the Squelch_Enable parameter is unset (i.e., squelch is disabled), both of the timers are stopped and the data path is activated.

When the process is in the squelch state (i.e., the squelch status flag is set), the finite state machine 207 will load the Squelch_Autoclear_Timer 210 parameter value, if it is enabled (i.e., the Squelch_Autoclear_Enable parameter is set). Then, it waits until squelch is disabled, manually cleared (i.e., the Squelch_Clear parameter is set), or the Autoclear Timer expires. However, when a character strobe is received, the Squelch_Autoclear_Timer 210 is restarted.

Shutting down the incoming babbling traffic at the ingress serial port has the advantage of not consuming an unnecessary amount of node and network resources that would result if no babbling detection is present or if squelch was enabled deeper in the network. Also, shutting down the incoming babbling traffic at the ingress serial port renders the system 100 more efficient in serial data serializing and packetizing.

When any of the software and/or hardware components of the transmitting serial device 101 "babble", it can cause the receiving device 105 and the receiving serial device 106 to become jammed and thereby prevent the receiving device 105 and the receiving serial device 106 from communicating with other devices in the network 104.

It should be appreciated by those skilled in the art that any block diagrams herein represent conceptual views of illustrative circuitry embodying the principles of the invention. Similarly, it will be appreciated that any flow charts, flow diagrams, state transition diagrams, pseudo code, and the like represent various processes which may be substantially represented in machine readable media and so executed by a computer or processor, whether or not such computer or processor is explicitly shown.

Accordingly, it is to be understood that the above description is intended to be illustrative and not restrictive. Many embodiments and applications other than the examples provided would be apparent upon reading the above description. The scope should be determined, not with reference to the above description or Abstract below, but should instead be determined with reference to the appended claims, along with the full scope of equivalents to which such claims are entitled. It is anticipated and intended that future developments will occur in the technologies discussed herein, and that the disclosed systems and methods will be incorporated into such future embodiments. In sum, it should be understood that the application is capable of modification and variation.

The benefits, advantages, solutions to problems, and any element(s) that may cause any benefit, advantage, or solution to occur or become more pronounced are not to be construed as a critical, required, or essential features or elements of any or all the claims. The invention is defined solely by the appended claims including any amendments made during the pendency of this application and all equivalents of those claims as issued.

Moreover in this document, relational terms such as first and second, top and bottom, and the like may be used solely to distinguish one entity or action from another entity or action without necessarily requiring or implying any actual such relationship or order between such entities or actions. The terms "comprises," "comprising," "has," "having," "includes," "including," "contains," "containing" or any other variation thereof, are intended to cover a non-exclusive inclusion, such that a process, method, article, or apparatus that comprises, has, includes, contains a list of elements does not include only those elements but may include other elements not expressly listed or inherent to such process, method, article, or apparatus. An element proceeded by "comprises . . . a," "has . . . a," "includes . . . a," or "contains . . . a" does not, without more constraints, preclude the existence of additional identical elements in the process, method, article, or apparatus that comprises, has, includes, contains the element. The terms "a" and "an" are defined as one or more unless explicitly stated otherwise herein. The terms "substantially," "essentially," "approximately," "about" or any other version thereof, are defined as being close to as understood by one of ordinary skill in the art, and in one non-limiting embodiment the term is defined to be within 10%, in another embodiment within 5%, in another embodiment within 1% and in another embodiment within 0.5%. The term "coupled" as used herein is defined as connected, although not necessarily directly and not necessarily mechanically. A device or structure that is "configured" in a certain way is configured in at least that way, but may also be configured in ways that are not listed.

It will be appreciated that some embodiments may be comprised of one or more generic or specialized processors (or "processing devices") such as non-general purpose microprocessors, digital signal processors, customized processors and field programmable gate arrays (FPGAs) and unique stored program instructions (including both software and firmware) that control the one or more processors to implement, in conjunction with certain non-processor circuits, some, most, or all of the functions of the method and/or apparatus described herein. Alternatively, some or all functions could be implemented by a state machine that has no stored program instructions, or in one or more application specific integrated circuits (ASICs), in which each function or some combinations of certain of the functions are implemented as custom logic. Of course, a combination of the two approaches could be used.

The Abstract of the Disclosure is provided to allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in various embodiments for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separately claimed subject matter.

What is claimed is:

1. A circuit for squelching and unsquelching ingress traffic on a serial port, the circuit comprising:
   a squelch timer on the serial port;
   an idle timer on the serial port, and
   a state machine on the serial port configured to:
      enable squelch and enable a data path;
      load and start the squelch timer when a character is received by the serial port;
      load and start the idle timer;
      activate a squelch state when the squelch timer expires before the idle timer; and
      disable the data path.

2. The circuit of claim 1, further comprising:
   an auto clear timer where the state machine is configured to load and start the auto clear timer after the squelch state is activated.

3. The circuit of claim 2, wherein the state machine is configured to deactivate the squelch state when the auto clear timer expires, when the squelch state is manually cleared, or when the squelch is disabled.

4. The circuit of claim 2, wherein the auto clear timer is configured to be set for a user configurable amount of time.

5. The circuit of claim 1, wherein the idle timer is reset when a character is received before the expiration of the idle timer.

6. The circuit of claim 1, wherein the state machine returns to an idle state when the idle timer expires before the squelch timer.

7. The circuit of claim 1, further comprising:
a plurality of configuration registers which include parameters configured according to a characteristic of the serial port including, baud rate, character length, parity, and number of stop bits.

8. The circuit of claim 1, wherein the finite state machine is a field-programmable gate array integrated circuit.

9. The circuit of claim 1, wherein the idle timer is configured to be set for a user-configurable amount of time.

10. The circuit of claim 1, wherein the characters are received from an asynchronous RS232 port.

11. A method for squelching and unsquelching ingress traffic on a serial port, the method comprising the steps of:
enabling, by a state machine on the serial port, squelching and a data path;
loading and starting, by the state machine, a squelch timer on the serial port when a character is received by the serial port;
loading and starting, by the state machine, an idle timer on the serial port;
activating, by the state machine, a squelch state when the squelch timer expires; and
terminating, by the state machine, the data path.

12. The method of claim 11, further comprising:
loading and starting, by the state machine, the auto clear timer after the squelch state is activated.

13. The method of claim 12, wherein the state machine is configured to deactivate the squelch state when the auto clear timer expires, when the squelch state is manually cleared, or when the squelch is disabled.

14. The method of claim 12, wherein the auto clear timer is configured to be set for a user configurable amount of time.

15. The method of claim 11, wherein the idle timer is reset when a character is received before the expiration of the idle timer.

16. The method of claim 11, wherein the state machine returns to an idle state when the idle timer expires before the squelch timer.

17. The method of claim 11, further comprising:
configuring, a plurality of configuration registers, according to a characteristic of the serial port including, baud rate, character length, parity and number of stop bits.

18. The method of claim 11, wherein the idle timer is configured to be set for a user-configurable amount of time.

19. The method of claim 11, wherein the characters are received from an asynchronous RS232 port.

* * * * *